United States Patent [19]

Andersson et al.

[11] Patent Number: 5,634,329

[45] Date of Patent: Jun. 3, 1997

[54] METHOD OF MAINTAINING A NOMINAL WORKING TEMPERATURE OF FLUE GASES IN A PFBC POWER PLANT

[75] Inventors: Marie Andersson; Mats Andersson; Christer Gerward; John Weatherby, all of Finspong, Sweden

[73] Assignee: ABB Carbon AB, Finspong, Sweden

[21] Appl. No.: 649,477

[22] Filed: May 17, 1996

Related U.S. Application Data

[63] Continuation of Ser. No. 325,393, filed as PCT/SE93/00372, Apr. 28, 1993, published as WO93/22600, Nov. 11, 1993, abandoned.

[30] Foreign Application Priority Data

Apr. 30, 1992 [SE] Sweden .................. 9201402

[51] Int. Cl.⁶ .................. F02C 3/26; F02C 6/18
[52] U.S. Cl. .................. 60/39.06; 60/39.182; 60/39.464; 122/4 D
[58] Field of Search .................. 60/39.06, 39.12, 60/39.182, 39.464; 122/4 D

[56] References Cited

U.S. PATENT DOCUMENTS

| | | | |
|---|---|---|---|
| 4,161,917 | 7/1979 | Jubb | 60/39.464 |
| 4,338,074 | 7/1982 | Johansson | 431/6 |
| 4,476,790 | 10/1984 | Borio | 122/4 D |
| 4,669,399 | 6/1987 | Martin et al. | |
| 4,974,411 | 12/1990 | Bruckner et al. | |
| 5,048,432 | 9/1991 | Hofmann et al. | 122/4 D |
| 5,178,101 | 1/1993 | Bell | 122/4 D |
| 5,251,434 | 10/1993 | Sugita et al. | 60/39.464 |
| 5,365,889 | 11/1994 | Tang | 122/4 D |

FOREIGN PATENT DOCUMENTS

| | | |
|---|---|---|
| 144172 | 6/1985 | European Pat. Off. . |
| 0 363 812 | 4/1990 | European Pat. Off. . |
| 32 18 724 | 11/1983 | Germany . |
| 40 00 319 | 8/1990 | Germany . |
| 466 814 | 4/1992 | Sweden . |

*Primary Examiner*—Louis J. Casaregola
*Attorney, Agent, or Firm*—Pollock, Vande Sande & Priddy

[57] ABSTRACT

A method for maintaining a nominal working temperature of flue gases during operation of a PFBC power plant having a pressure vessel with a combustor enclosed therein for combustion of a fuel in a fluidized bed, a gas turbine for receiving flue gases formed during the combustion in the combustor, a compressor driven by the gas turbine for compression of air which is utilized as combustion air during the combustion in the combustor, and a steam turbine driven by steam generated in tube bundles in the bed, includes the steps of burning a complementary fuel in the flue gases generated during the combustion in the fluidized bed downstream of the tube bundle for increasing the flue gas temperature to a nominal level for the process and using oxygen residues in the flue gas as oxidizing agents during combustion of the complementary fuel.

14 Claims, 1 Drawing Sheet

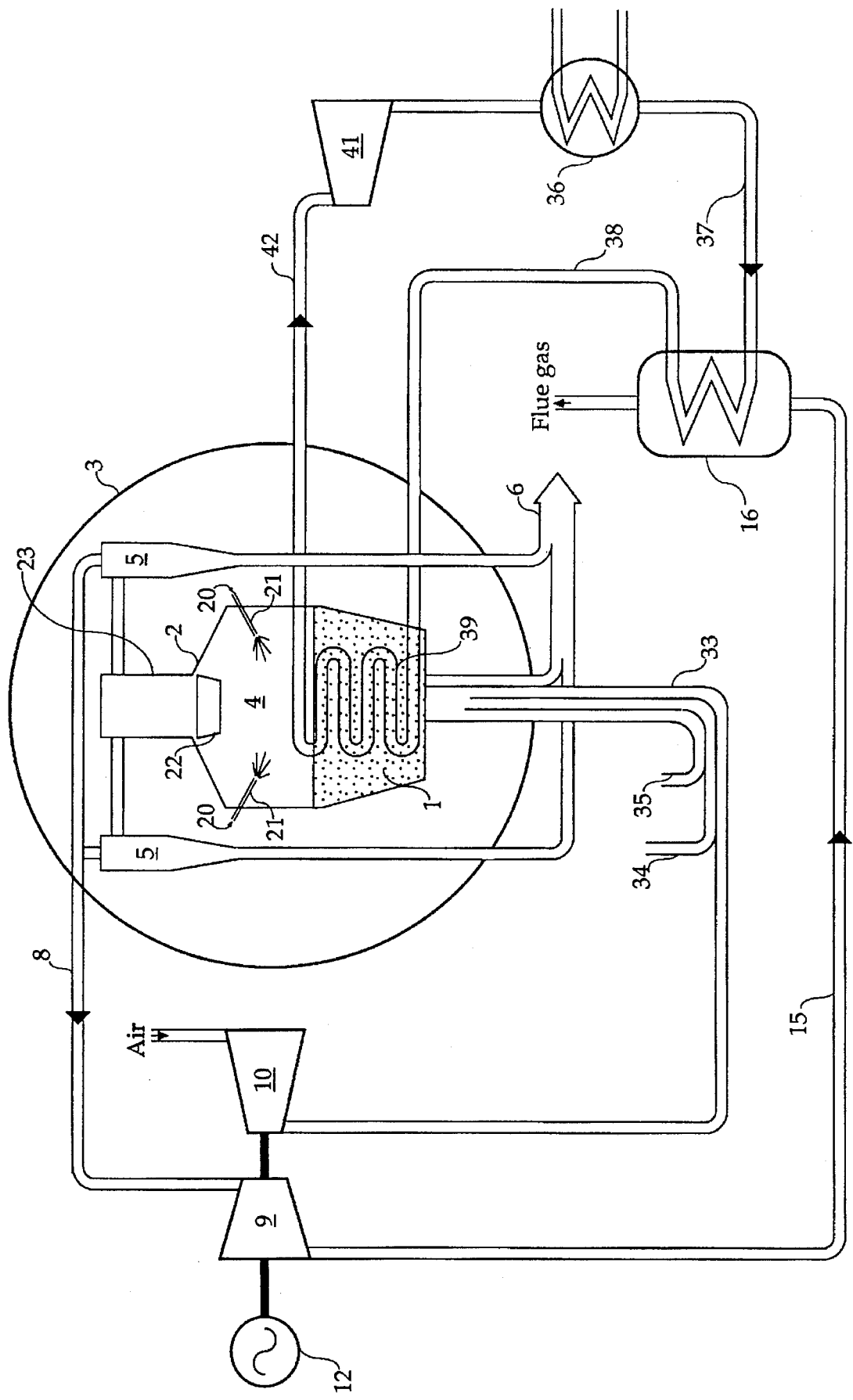

METHOD OF MAINTAINING A NOMINAL WORKING TEMPERATURE OF FLUE GASES IN A PFBC POWER PLANT

This application is a continuation of U.S. patent application Ser. No. 08/325,393, filed as PCT/SE93/00372, Apr. 28, 1993, published as WO93/22600, Nov. 11, 1993, abandoned.

TECHNICAL FIELD

The present invention relates to a method, for increasing the performance and maintaining low emissions of gaseous environmental pollutants under all load conditions, during operation of a PFBC power plant, in particular during partial load operation of the plant, by optimizing the temperature level of the flue gases generated in the plant. The optimization of the flue gas temperature is attained by firing of a complementary fuel supplied to the flue gases.

BACKGROUND OF THE INVENTION

During combustion of particular fuel, usually coal, in a pressurized fluidized bed in a PFBC power plant, the bed is supplied with combustion air in the form of compressed air from the pressure vessel which surrounds a combustor, in which the fluidized bed is arranged, via fluidization nozzles below the bed. The flue gases which are generated during the combustion process pass, in the combustor, through a freeboard above the bed surface, are cleaned and supplied to a gas turbine. The flue gases drive the gas turbine, which in turn drives a generator as well as a compressor which supplies the pressure vessel with compressed air. The combustion air, the flue gases and the devices which handle these gases are included in the gas cycle of the plant. The gas cycle thus includes, among others, the gas turbine.

For cooling the bed to a temperature of about 850° C., a steam generator in the form a tube bundle, which constitutes a component in a steam cycle, is placed in the bed. The designation tube bundle is used here to describe a component which is usually divided into a plurality of tube bundles. Steam is generated in the tube bundle, energy being extracted from the bed via the steam turbines to which the steam is passed in the steam cycle. At full load the entire tube bundle is within the bed. The cooling capacity of the tube bundle must be dimensioned to the power output from the bed to be able to maintain the correct bed temperature during full load operation of the plant. If the reduction of the power output is achieved by a reduced fuel supply, the power generation in the bed is decreased, while at the same time the cooling capacity of the tube bundle is unchanged, which entails an undesired reduction of the bed temperature. The cooling capacity of the tube bundle in the bed can be reduced by lowering the bed level, whereby part of the tube bundle will be located above the surface of the bed. As a consequence of this, a load change in the plant is normally controlled by reducing the cooling capacity of the tube bundle in the bed by varying the bed level, in which case a certain part of the tubes in the tube bundle may be above the bed surface, thus not cooling the bed. On the other hand, the exposed tubes cool the flue gases flowing from the bed to the gas turbine, the temperature of the flue gases thus being reduced, which entails a further addition to the power reduction in the gas turbine during partial load operation, that is to say that the steps taken to change the power output from the steam turbine lead to a corresponding change of the power output from the gas turbine.

During power control, the fuel and the air quantity supplied to the bed must be controlled in dependence on the power extracted from the bed and the bed level at the same time be controlled such that the cooling capacity of the tube bundle is adapted to the energy supply, whereby the correct bed temperature is maintained. At constant load output, the height of the bed is kept constant.

The normal way of reducing the power output to the steam turbine is to lower the bed height. A consequence of this is, as mentioned, that exposed steam tubes above the bed surface will then cool combustion gases flowing to the gas turbine, thus further reducing the gas turbine power. In this way, also the partial load efficiency of the plant is reduced.

During combustion in a plant of the kind mentioned, nitrogen compounds, $NO_x$, are formed as a constituent in the flue gases. For environmental reasons, the aim is to considerably reduce the contents of nitrogen oxides in the flue gases. This is done, for example, by supplying ammonia to the flue gases, thus achieving reduction of $NO_x$. This chemical process, whereby $NO_x$ in the waste gases is reduced by the addition of ammonia, proceeds optimally during full load operation of the power plant, that is, when the flue gas temperature amounts to about magnitude of 850° C., at which temperature the flue gases, with a good result, are freed from the greater part of the $NO_x$ contents. During partial load operation of the plant, when the flue gases keep a lower temperature, the $NO_x$ reduction process with reduction with $NH_3$ does not function satisfactorily, and therefore other means have to be introduced such as, for example, the use of catalysts, for the removal of nitrogen compounds in the flue gases to be completed in an acceptable way. In addition, such catalysts render the plant considerably more expensive.

It is known to increase the efficiency for the entire plant by secondary combustion in the flue gas paths to considerably raise the temperature of the hot gases supplied to the gas turbine. See, for example, EP-B-144 172. With such a secondary combustion, the temperature of the gases can be raised, for example to the order of magnitude of 1300°1400° C., thus creating more favorable conditions, from the point of view of efficiency, for utilizing a gas turbine. However, such a type of secondary combustion, whereby the temperature of the flue gases is raised considerably ahead of the inlet to the gas turbine, does not solve the problems which in this description are shown to be associated with partial load and the effect of measures for reduction of nitric oxides. In addition, efforts for mechanical separation of dust particles in the flue gases, for operation at the high flue gas temperature mentioned, are rendered more difficult.

During operation of a PFBC power plant, the flue gas temperature may be allowed to vary within the temperature interval of 400° C.–900° C. At a temperature as high as 900° C., certain ash particles may melt on the surface, thus forming harmful agglomerates which disturb the function of the process. The lowest temperature limit mentioned is not very favorable either, since, among other things, the performance of the gas turbine is then greatly reduced.

It would be desirable to achieve a constant temperature of the flue gases leaving the combustor, both during full load and partial load operation.

For reasons of compromise a nominal working temperature of around 850° C. is chosen for both the bed and the flue gases, for which working temperature the components in the plant are dimensioned. This compromise is based on a balancing based on conditions relating to combustion in the bed and on creating as high a temperature as possible for the gases which are distributed to the gas turbine. It would be favorable to reduce the temperature of the bed by some 10 or 30 degrees centigrade. When, for example, coal is used as fuel, alkali metals bound in the coal are evaporated and deposited on surfaces in the flue gas walls, for example on blades in the gas turbine. In addition, certain types of coal contain a greater percentage of such alkali metals, so this problem is accentuated when using such coal during the combustion. Also the flue gas temperature could advantageously be maintained higher, for example some 10 to 30 degrees centigrade, than the chosen working temperature (850° C.) without cleaning processes in the flue gas paths being disturbed.

When designing a PFBC power plant, this is dimensioned for full load operation at maximum air flow through the combustion process. Since the density of the air is greatest at the lowest presumptive exterior air temperature at the site of the plant, the plant will consequently perform full load only at this lowest exterior air temperature. In principle, this means that the plant is operated under partial load conditions as soon as the exterior air temperature deviates from the lowest temperature for which the plant has been designed. In the following description, the word partial load also includes such unintentional partial load operation as is caused by raised exterior air temperatures.

The publication EP 363812, A2, demonstrates for a plant of AFB type, that is, a plant with a fluidized bed at atmospheric pressure, a method for reducing the relatively high percentage of CO gas, generated in the bed in this type of plant, by converting CO to $CO_2$ during a combustion of CO with the aid of additional air. To allow this combustion to take place with sufficient speed, the working temperature in a space above the bed is raised by supplying extra fuel above the bed.

The combustion in the bed in the described AFB plant takes place, for the purpose of reducing the generation of $NO_x$ gases, under sub-stoichiometric conditions, that is, the combustion of the fuel in the bed takes place when there is a deficiency of air, which in turn causes a high percentage of CO in the waste gases from the bed. Further, it should be emphasized that the combustion of the additional fuel according to the known technique described in the publication is not performed downstream of steam generating and superheating tubes, whereby another object of the extra combustion is to maintain high temperatures to the steam tubes which are located downstream of the region for combustion of the additional fuel.

In a PFBC power plant the combustion in the fluidized bed takes place at high pressure and under superstoichiometric conditions, that is to say that air is supplied to the bed in such quantity that there is excess air in all parts of the bed where metal objects, for example boiler tubes, are present. This excess air is necessary for the formation of erosion-resistant oxide layers on the metal surfaces, but also for achieving as complete a final combustion of the bed fuel as possible. Under normal operating conditions, very small amounts of CO are then formed, and therefore no extra combustion with air supplied above the bed is necessary.

The excess air which is supplied to the bed in a PFBC plant in turn causes a relatively high percentage of $NO_x$ gases in the flue gases from the bed, which $NO_x$ gases must be removed, preferably within a temperature interval around the normal working temperature for the freeboard.

SUMMARY OF THE INVENTION

The present invention relates to a method for maintaining a nominal working temperature of the flue gases in a PFBC power plant during partial load operation of the plant, by arranging firing of a complementary fuel in the flue gases downstream of the uppermost tubes in the bed. This firing is achieved by injecting a fuel, mixing it well into the flue gases, and igniting it. By the combustion of the complementary fuel, the temperature of flue gases leaving the combustor is raised to the nominal working temperature of the flue gases.

During continuous combustion of a complementary fuel downstream of the uppermost tubes in the bed, the method also makes possible an optimization of the temperature levels for the bed and the flue gases by allowing these levels to deviate somewhat from one another.

A good mixing of the ignited complementary fuel in the flue gases provides low values of the maximum temperature of the mixture, whereby ash particles in the flue gases do not melt, which prevents deposition of molten ash particles internally in flue gas spaces. A low maximum temperature also minimizes the evaporation of alkali metals in ash particles.

The firing of the complementary fuel is suitably performed in the freeboard above the bed. This is achieved by arranging nozzles for injection of complementary fuel, for example at the walls of the freeboard. When being injected, the fuel is self-ignited because of the high temperature in the freeboard, thus causing the fuel to burn in the oxygen residue which the fuel gases from the combustion in the bed contain.

The advantages obtained with the complementary firing at partial load according to the above are, among other things, that the necessary catalyst volume for the removal of residues of nitrogen compounds in the flue gases is reduced or completely eliminated, the emission of laughing gas, $N_2O$, is considerably reduced at elevated flue gas temperature, a certain $NO_x$ reduction in the flue gases takes place during complementary firing, also without addition of $NH_3$, the reduction of oxides containing nitrogen by means of, for example, ammonia functions with the intended effect in the entire load interval, the emission of carbon oxide, CO, at low load is practically eliminated, the combustion efficiency is increased, the content of unburnt coal in the ash which is separated in dust separators for flue gases downstream of the freeboard is reduced, the partial load efficiency of the plant is increased, the tube bundle can be designed for the lowest exterior air temperature, that is, for maximum air flow, while maintaining the nominal working temperature of the flue gases, also during operation at elevated exterior air temperature, a higher output power for the plant is achieved by the possibility of utilizing a greater percentage of the air in the total process, air residues being consumed during the complementary firing, the gas turbine is given a possibility of continuously working at a constant, and maximum, inlet temperature for the gas turbine within the entire load range of the plant, when the flue gas temperature is maintained constant, the temperature cycling is reduced, which otherwise arises when changing between different load states, which reduces the stresses on components (e.g. dust separators) in the flue gas paths, resulting in increased life of these components.

In the case of complementary firing, the bed temperature can be reduced somewhat, for example to 840° C., for the alkali evaporation to be reduced, while at the same time the flue gas temperature can be raised, for example to 870° C.

The advantages obtained during continuous combustion of a complementary fuel with a possibility of choosing optimum levels of the temperatures in the bed and the flue gases, respectively, are, for example, in addition to those mentioned above, that the evaporation of alkali metals from the fluidized fuel is reduced since the bed temperature can be somewhat lowered.

When the complementary firing in the flue gases downstream of the bed at low load functions satisfactorily, the catalyst for removing environmental pollution in the flue gases could probably be entirely dispensed with.

By optimizing the air flow to the combustion process in and downstream of the bed, the power requirement from the complementary firing can be maintained at a relatively low level.

A constant flue gas temperature and the utilization of $NO_x$ reduction by means of $NH_3$ create a possibility of operating the plant with a higher excess air in the bed, without the $NO_x$ values becoming too high. This leads to higher speeds of load change, since this creates a greater margin with respect to excess air, that is, the fuel flow can be rapidly increased.

If the complementary fuel contains sulphur, which can increase the emission of sulphur dioxide from the plant, this negative side effect from the complementary firing can be reduced or completely eliminated by simultaneous injection of a finely ground limestone or dolomite to the freeboard or another space downstream of the bed. However, this is no major problem since the power requirement from the complementary firing is so low that any increase of $SO_2$ emission is marginal during complementary firing according to the invention.

BRIEF DESCRIPTION OF THE DRAWING

The accompanying figure schematically illustrates a PFBC power plant with its primary components indicated and further illustrates a preferred location of the complementary firing downstream of the bed in the flue gases at partial load according to the invention.

DESCRIPTION OF THE PREFERRED EMBODIMENTS

With reference to the accompanying figure, a number of preferred embodiments of the invention will be described.

FIG. 1 shows a general process diagram according to the present invention. In this, combustion of a fuel takes place in a fluidized bed 1 in a combustor 2 enclosed in a pressure vessel 3. The flue gases formed during the combustion in the bed 1 pass a freeboard 4 above the bed 1 and are cleaned from dust in dust separators 5, which in the figure are exemplified by cyclones. Dust separated from the dust separators 5 and ash from the bed 1 are discharged via a schematically shown outlet 6 to storage containers (not shown). The cleaned flue gases from the dust separators 5 are passed via a flue gas duct 8 to a gas turbine 9, which drives a compressor 10 as well as a generator 12 for generating electric energy. The flue gases expanded in the gas turbine 9 are passed along a channel 15 to a waste gas cooler 16, where the flue gases are further cooled by preheating feedwater in a steam circuit in the plant.

The compressor 10 compresses air supplied to its inlet to a pressure amounting to the order of magnitude of 4–16 bar (the lowest value at low load), whereupon the compressed air is supplied, via the conduit 33, to the pressure vessel 3 for pressurizing the vessel and is passed on to the bed 1 as combustion air and fluidization gas.

In the exemplified plant, the bed 1 is supplied with particulate coal via a conduit 34, whereas absorbent is added via a supply conduit 35.

The steam circuit is symbolized in the figure by feedwater which is circulated from a condenser tank 36 via the conduit 37 to a preheater for the feedwater in the form of the waste gas cooler 16, whereupon feedwater is distributed via a feedwater conduit 38 to tube bundles 39 in the bed 1 for generating/superheating steam. The generated/superheated steam is passed on to a steam turbine 41 via steam conduits 42. Condensate and expanded steam are returned to the condenser 36.

According to the invention, a number of fuel nozzles 21 are arranged in the freeboard 4 above the tube bundle 39. During partial load operation of the plant, when tubes in the tube bundle 39 are partially exposed, as illustrated in the Figure, the connections 20 of the nozzles 21 are supplied with a, suitably inflammable, fuel. A preferred fuel is gas. Alternatively, an oil-based liquid is used, for example paraffin, diesel oil or fuel oil. Other alternative fuels are solid fuels as, for example, pulverized coal, peat or chips. When choosing solid fuels, of course, the injection system is rendered more complicated.

The fuel is injected into the freeboard with such a pressure or together with a carrier agent such that the fuel is well mixed into the flue gases before it is self-ignited owing to the relatively high temperature which prevails there (usually 500° C.–850° C., but values between 400° and 900° C. are possible). The injection pressure of the fuel and the fed-in fuel quantity are determined in dependence on the cooling capacity of the exposed tube surfaces in the tube bundle 39. The control of the fuel quantity takes place in dependence on measured values of the flue gas temperature in the flue gas duct 8 and on oxygen residues in the flue gases detected in the flue gas duct 8. As an example it may be mentioned that the flue gases need to be heated within the interval 500° C.–900° C. in dependence on the degree of partial load. (The highest value in the interval is determined by the chosen working temperature for the flue gases.) Without heating the flue gases the temperature thereof may drop down to 500° C. provided that no alternative measures are taken to maintain the temperature of escaping flue gases during partial load operation of the plant.

In an alternative embodiment of the plant, a mixer 22 is arranged at the inlet of a flue duct 23 for the flue gases. The task of this mixer 22 is to further mix flue gases and heated gases generated during the combustion in connection with the complementary firing via the fuel nozzles 21. By this mixing, a reduction of nitrogen compounds in the waste gases generated during the combustion in the combustor 2 can be efficiently carried out in the vicinity of the mixer 22.

According to a preferred embodiment, for example, the mixer 22 consists of oblique blades in a ring in a propeller- or turbine-like arrangement. By means of this mixer 22, the waste gases in the freeboard 4 and the flue duct 23 are set in rotation, whereby the different gases in the freeboard are effectively mixed, which is a condition for the $NO_x$ reduction to proceed effectively and evenly in the whole flue gas flow.

In an additional alternative, ammonia can also be injected in the vicinity of the dust separators 5, where a good gas intermixture prevails. It is further possible to combine different injection regions in the flue gas spaces to reach good $NO_x$ reduction results with a low consumption of ammonia.

The location and design of the fuel nozzles 21 can be varied in many ways within the scope of the inventive concept.

As mentioned, the complementary fuel may require a carrier agent to achieve a good mixing into the flue gases and a low maximum temperature locally during the complementary combustion. In one embodiment, injection of the complementary fuel is arranged together with steam to achieve a high impulse during the injection and hence a good mixing of the fuel injected into the flue gas.

In an embodiment with complementary firing, where finely ground coal is utilized as fuel, coal is premixed and injected together with finely ground limestone to reduce the emission of $SO_2$ from the burnt pulverized coal.

We claim:

1. A method for maintaining a nominal working temperature of flue gases during operation of a PFBC power plant having a pressure vessel with a combustor enclosed therein for combustion of a fuel in a fluidized bed, a gas turbine for receiving flue gases formed during the combustion in the combustor, a compressor driven by the gas turbine for compression of air which is utilized as combustion air during the combustion in the combustor, and a steam turbine driven by steam generated in tube bundles in the bed, comprising the steps of:

a) injecting a complementary fuel into the combustor downstream of the tube bundle during at least normal operation of the PFBC power plant; and b) burning said complementary fuel in oxygen residues contained in said flue gas as oxidizing agents during combustion of the complementary fuel whereby increasing the flue gas temperature to a nominal level for the process.

2. A method according to claim 1, wherein said burning is performed during partial load operation of the plant.

3. A method according to claim 1, wherein said burning takes place in a freeboard downstream of the bed in the combustor.

4. A method according to claim 1, wherein said complementary fuel consists of a combustible gas.

5. A method according to claim 1, wherein said complementary fuel consists of an inflammable liquid.

6. A method according to claim 5, wherein said inflammable liquid is one of paraffin, diesel oil and fuel oil.

7. A method according to claim 1, wherein said complementary fuel consists of a solid fuel.

8. A method according to claim 7, wherein said solid fuel is finely ground pulverized coal, or peat or chips.

9. A method according to claim 1 wherein said complementary fuel is self-ignited and wherein said method further includes the step of injecting said complementary fuel into the flue gases through fuel nozzles.

10. A method according to claim 1 further including the step of injecting said complementary fuel together with a carrier agent.

11. A method according to claim 1 further comprising the step of mixing heated gases formed during the combustion of the complementary fuel in the flue gases with a mixer.

12. A method according to claim 1 further comprising the step of raising a temperature of escaping flue gases to the nominal temperature for the flue gases generated during the process by burning the complementary fuel.

13. A method according to claim 12 wherein said nominal temperature is from 850° C. to 870° C.

14. A method according to claim 1 further comprising the step of injecting lime into the flue gases with a sulphur-containing complementary fuel.

* * * * *